US011483986B1

(12) United States Patent
Soper

(10) Patent No.: US 11,483,986 B1
(45) Date of Patent: Nov. 1, 2022

(54) VEHICLE MOUNTED LAWN DETHATCHER

(71) Applicant: Gary Hugh Soper, Selwyn (CA)

(72) Inventor: Gary Hugh Soper, Selwyn (CA)

( * ) Notice: Subject to any disclaimer, the term of this patent is extended or adjusted under 35 U.S.C. 154(b) by 0 days.

(21) Appl. No.: 17/697,358

(22) Filed: Mar. 17, 2022

(51) Int. Cl.
*A01G 20/43* (2018.01)
*A01B 45/00* (2006.01)

(52) U.S. Cl.
CPC .............. *A01G 20/43* (2018.02); *A01B 45/00* (2013.01)

(58) Field of Classification Search
CPC ................................. A01G 20/43; A01B 45/00
See application file for complete search history.

(56) References Cited

U.S. PATENT DOCUMENTS

| | | | | |
|---|---|---|---|---|
| 3,765,159 A * | 10/1973 | Neff | ........................ | A01B 45/00 56/396 |
| 4,179,828 A * | 12/1979 | Brunty | ...................... | E01H 1/12 56/400.05 |
| 4,472,930 A * | 9/1984 | Smith | ..................... | A01B 45/00 56/396 |
| 4,945,996 A * | 8/1990 | Codding | ................ | A01B 63/14 56/395 |
| 6,655,469 B1 * | 12/2003 | Davis | ..................... | A01B 45/02 172/615 |
| 7,604,066 B2 * | 10/2009 | Hickenbottom | ....... | A01B 35/28 172/540 |
| 8,220,240 B2 * | 7/2012 | Tielburger | .............. | A01D 43/02 56/193 |
| 9,832,935 B1 * | 12/2017 | Nitz | ......................... | A01G 20/43 |
| 10,375,873 B2 * | 8/2019 | Campbell | ............... | A01B 63/22 |
| 10,947,685 B1 * | 3/2021 | Hirshberg | ........... | A47L 11/4013 |

(Continued)

FOREIGN PATENT DOCUMENTS

| | | | | |
|---|---|---|---|---|
| DE | 202012010494 U1 * | 3/2014 | ............. | A01G 20/43 |
| GB | 2197172 A * | 5/1988 | ............. | A01B 45/00 |
| GB | 2584835 A | 12/2020 | | |

OTHER PUBLICATIONS

BRINLY "Owner's Manual for DETHATCHER Model DT-48 BH".
He-Va ApS, he-va.com/produkter/udgaede.produkter.com.

*Primary Examiner* — Marc Carlson
(74) *Attorney, Agent, or Firm* — Argus Intellectual Enterprise; Jordan Sworen; Daniel Enea

(57) ABSTRACT

A towable lawn dethatching device for use with a vehicle, containing:
a. a frame having a front end, a rear end, a top, a bottom and two sides;
b. a plurality of horizontally spaced apart tines supported by the frame; each of the plurality of horizontally spaced-apart tines having a first end and a second end;
c. at least one wheel supported by the frame;
d. a mounting portion adapted to pivotably couple the lawn dethatching device to the vehicle in a vertical axis, the lawn dethatching device is moveable between:
e. a first position wherein the plurality of horizontally spaced-apart tines are in a dethatching position, wherein the first end of each of the plurality of horizontally spaced-apart tines is above the second end of each of the plurality of horizontally spaced-apart tines, to dethatch and accumulate thatch while the vehicle is moving in a first direction; and
f. a second position wherein the plurality of horizontally spaced-apart tines are in a non-dethatching position, allowing the accumulated thatch of the first position to be collected into a pile while the vehicle is moving in a second direction.

20 Claims, 15 Drawing Sheets

(56) References Cited

U.S. PATENT DOCUMENTS

| | | | |
|---|---|---|---|
| 2006/0236670 A1* | 10/2006 | Glasford | A01D 43/02 56/257 |
| 2010/0313537 A1* | 12/2010 | Lundberg | A01B 45/00 56/14.7 |
| 2013/0043051 A1* | 2/2013 | Heying | A01B 45/00 172/145 |
| 2014/0262386 A1* | 9/2014 | Davis | A01B 45/00 172/612 |
| 2020/0121816 A1* | 4/2020 | Grossman | A01G 20/30 |

* cited by examiner

VEHICLE MOUNTED LAWN DETHATCHER

FIELD OF THE DISCLOSURE

This disclosure relates to a vehicle mounted lawn dethatching device, rear towable/pulled or front driven/pushed by a vehicle, allowing for facile collection and accumulation of thatch in at least one pile during the dethatching process without impeding the dethatching operation and without the operator leaving the vehicle.

BACKGROUND

Current dethatching devices require the operator to leave the vehicle and manually pull and/or remove the collected thatch away from the dethatcher, and in particular away from the front of the dethatcher tines, in order to continue dethatching the lawn. The above results in significant time off of the vehicle towing the dethatcher and increases potential injury of the operator due to the multiple times required to leave the vehicle in order to pull and/or remove the collected thatch away from the front of the dethatcher tines. There is a need for a dethatching device allowing for collection and accumulation of thatch in at least one pile during the dethatching process without the need for the operator of the vehicle to leave the vehicle in order to pull and/or remove the collected thatch away from the front of the dethatching tines in order to continue the dethatching process.

SUMMARY

According to one aspect, there is provided a lawn dethatching device for use with a vehicle, comprising:
a. a frame having a front end, a rear end, a top, a bottom and two sides;
b. a plurality of horizontally spaced apart tines supported by said frame; each of said plurality of horizontally spaced-apart tines having a first end and a second end;
c. at least one wheel supported by said frame;
d. a mounting portion adapted to pivotably couple the lawn dethatching device to said vehicle in a vertical axis, the lawn dethatching device is moveable between:
e. a first position wherein the plurality of horizontally spaced-apart tines are in a dethatching position, preferably vertically oriented, wherein said first end of each of said plurality of horizontally spaced-apart tines is above said second end of each of said plurality of horizontally spaced-apart tines, to dethatch and accumulate thatch while the vehicle is moving in a first direction; and
f. a second position wherein the plurality of horizontally spaced-apart tines are in a non-dethatching position, preferably horizontally oriented, allowing the accumulated thatch of the first position to be collected into a pile while the vehicle is moving in a second direction.

In one alternative, each of said plurality of horizontally spaced apart tines are laterally angled towards one side of the two sides of said frame. In one alternative, each of said plurality of horizontally spaced apart times are laterally angled towards one side of the two sides of said frame greater than 0° and less than about 60°. In another alternative, each of said plurality of horizontally spaced apart times are laterally angled towards one side of the two sides of said frame from about 30° to about 45°. In another alternative, each of said plurality of horizontally spaced apart times are laterally angled towards one side of the two sides of said frame at about 35°.

In one alternative, said plurality of horizontally spaced apart tines are rotatably coupled, preferably rotatable in a horizontal axis, to said frame.

In one alternative, said first end of each of said plurality of horizontally spaced-apart tines is rotatably coupled in a horizontal axis to said frame.

In one alternative, said dethatching device comprises a first set of wheels, in one alternative supported by said frame, for forward movement and dethatching movement.

In one alternative, said first set of wheels are a pair of wheels.

In one alternative, said first set of wheels are a pair of wheels, wherein each wheel of said first set of wheels is on a side of the frame allowing for the plurality of downwardly directed horizontally spaced-apart tines to be in the first position.

In one alternative, said dethatching device comprises a second set of wheels, in one alternative supported by said frame, for reverse movement and piling of accumulated thatch.

In one alternative, said second set of wheels are a pair of wheels.

In one alternative, said second set of wheels are a pair of wheels, wherein each wheel of said second set of wheels is on a side of the frame allowing for the plurality of horizontally spaced-apart tines to be in said second position and in a non-dethatching position, preferably horizontally oriented, and moving said lawn dethatching device in reverse and laterally, allowing the accumulated thatch accumulated at the first position to be collected into a pile while the vehicle is moving in a second direction and providing a clear path for said lawn dethatching device to move in said first or forward direction.

In one alternative, said second set of wheels are angled along a radial axle in a non-parallel configuration to said first set of wheels.

In one alternative, said second set of wheels are angled between about 30° and about 45° in relation to a radial axle of said first set of wheels.

In one alternative, said second set of wheels are laterally angled towards one side of the two sides of said frame. In one alternative one wheel of the second set of wheels is angled about 45° in an inside angle measurement in relation to a complementary wheel of the first set of wheels and the other wheel of the second set of wheels is angled about 135° in an inside angle measurement in relation to a complementary wheel of the first set of wheels. In one alternative, each wheel of said second set of wheels is adjustable in position along a mounting bracket.

In another alternative, said second end of each of said plurality of horizontally spaced-apart tines is anteriorly angled. In one alternative each of said plurality of horizontally spaced-apart tines is posteriorly angled. In one alternative, each of said plurality of horizontally spaced-apart tines is anteriorly angled from about 0° to about 30° in relation to said first end (or relative to vertical). In one alternative, each of said plurality of horizontally spaced-apart tines is posteriorly angled from about 0° to about 30° in relation to said first end (or relative to vertical). In yet another alternative, each of said plurality of horizontally spaced-apart tines are not angled posteriorly or anteriorly. However, the angle may be adjusted as need by the operator.

In one alternative, said first end of each of said plurality of horizontally spaced-apart tines is biased, preferably spring biased, to said frame.

In one alternative, said mounting portion extends from the front end of said frame, to said vehicle.

In one alternative, when said lawn dethatching device is to be in a non-dethatching mode, when starting to move said lawn dethatching device in a second or reverse direction, each of said rotatably coupled tines rotate to a reclined position and said first set of wheels are disengaged to be no longer in contact with said lawn and said second set of wheels are engaged to be in contact with said lawn moving said lawn dethatching device in a second direction, preferably reverse and laterally, along the lawn without dethatching said lawn allowing the accumulated thatch accumulated at the first position to be collected into a pile while the vehicle is moving in a second direction and providing a clear path for said lawn dethatching device to move in said first or forward direction when said first set of wheels are re-engaged.

In one alternative, said lawn dethatching device is to be in a dethatching mode, when starting to move said lawn dethatching device is a first or forward direction, each of said rotatably coupled tines rotate inclining to a vertical position and said second set of wheels are disengaged to be no longer in contact with said lawn and said first set of wheels are engaged to be in contact with said lawn moving said lawn dethatching device in a first direction forward and along a path, wherein said path is the same as the first or forward direction, in one alternative, said path is forward and along a path different than a previous first direction path allowing for each of said plurality of horizontally spaced-apart tines to engage said lawn and dethatch said lawn.

In one alternative, said frame further comprises a tine support supporting said plurality of horizontally spaced-apart tines.

In one alternative, said tine support comprises a tine shield.

In one alternative, said tine support supports said first set of wheels and said second set of wheels.

In one alternative, said plurality of horizontally spaced-apart tines are height adjustable.

In one alternative, said plurality of horizontally spaced-apart tines are height adjustable from 0 to 6 cm from a lawn and/or ground surface.

In one alternative, a terminus of said second end of each of said plurality of horizontally spaced-apart tines is anteriorly angled in relation to said second end. In one alternative, said terminus of said second end of each of said plurality of horizontally spaced-apart tines anteriorly angled from about 0° to about 45°. In one alternative, said terminus of said second end of each of said plurality of horizontally spaced-apart tines anteriorly angled from about 15° to about 25°. In one alternative, said terminus of said second end of each of said plurality of horizontally spaced-apart tines anteriorly angled about 22°.

In one alternative, said tine support is height adjustable.

In one alternative, said tine support is height adjustable from 0 to 6 cm from a lawn and/or ground surface.

In one alternative, said second set of wheels are height adjustable. In one alternative, said second set of wheels are height adjustable in relation to the height of the plurality of horizontally spaced-apart tines as above.

DETAILED DESCRIPTION

Figure 1A:
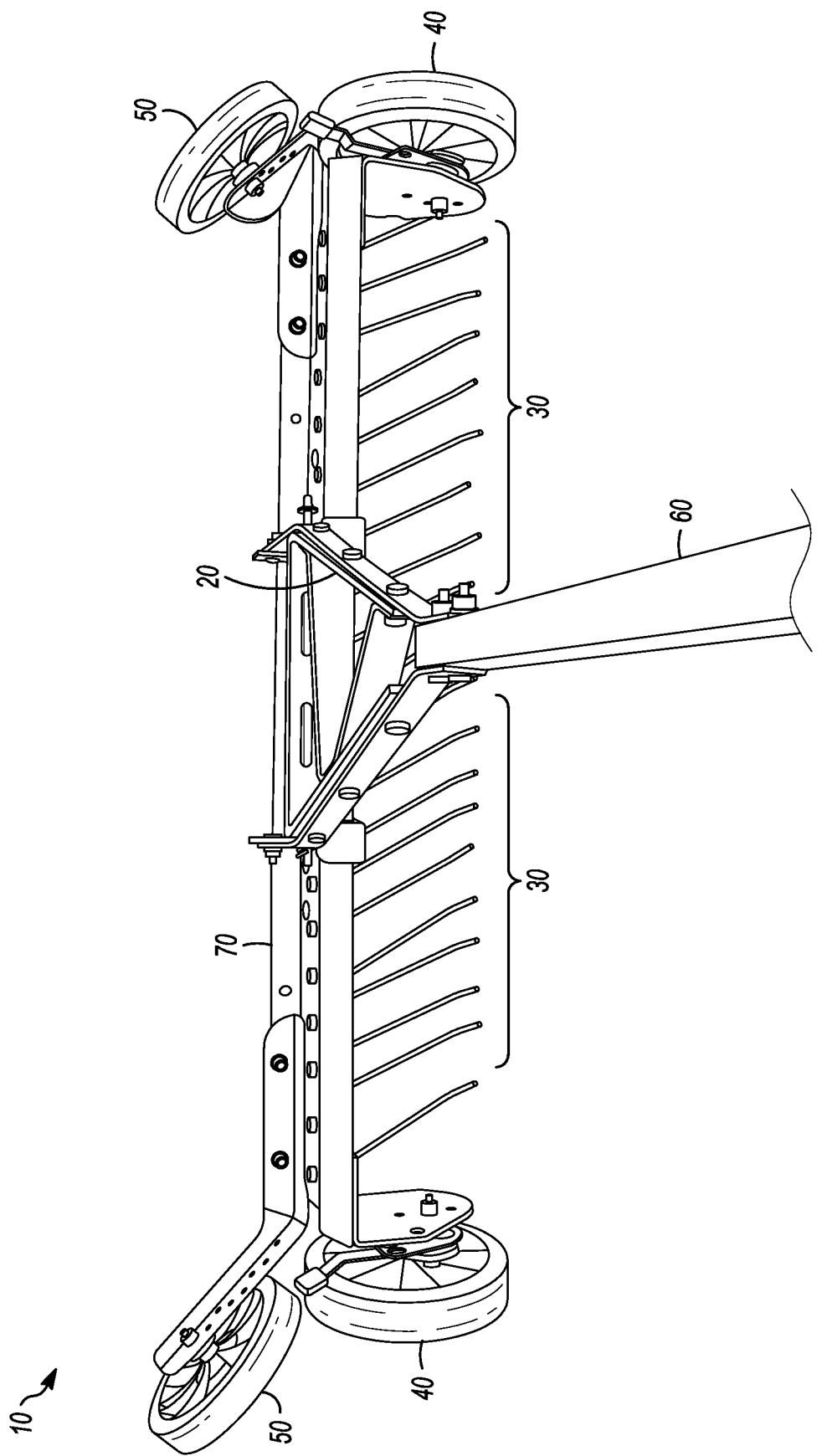
FIGS. 1A and 1B depict a front perspective view of the dethatching device in a dethatching position, according to one alternative
Figure 1B:
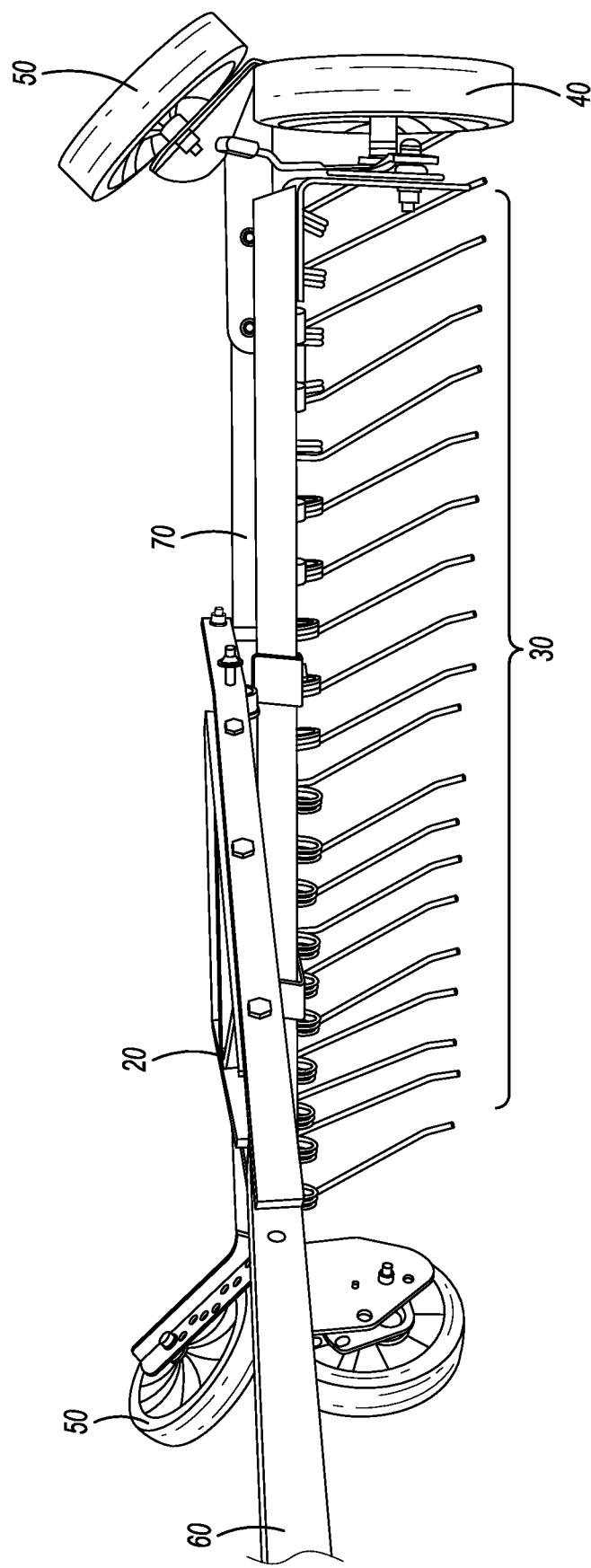
Figure 2:
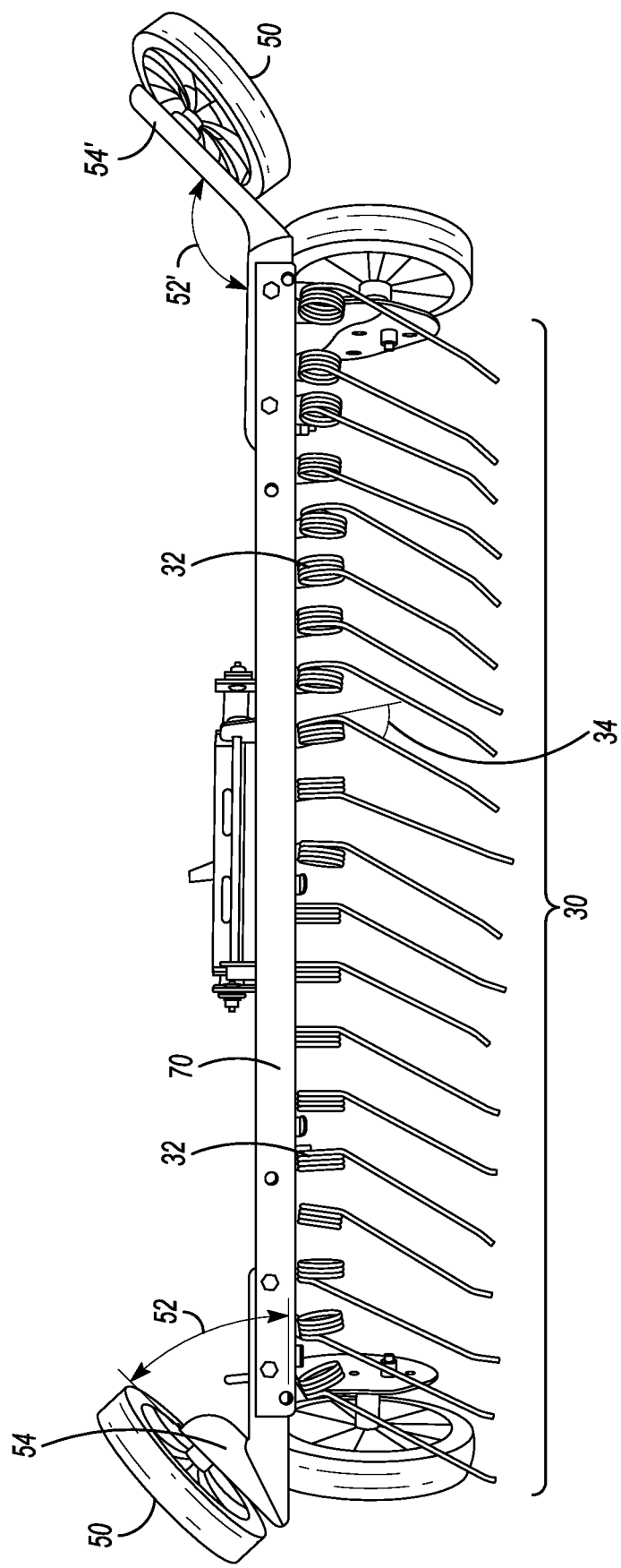
FIG. 2 depicts a rear view of the dethatching device in a dethatching position, according to one alternative

The following provides a list of components and their related reference numbers
10 lawn dethatching device
12 leaves
20 frame
22 horizontally disposed axle
24, 24' frame brackets
26, 26' frame arms
27 frame brace
28 tilt stops
29 hitch arm brackets
30 horizontally spaced-apart tines
31 body of tine
32 spring bias
34 lateral angle of horizontally spaced-apart tines
34' anterior/posterior angle of horizontally spaced-apart tines
36 bottom tine angle
40 first set of wheels
50 second set of wheels
52 acute angle of second set of wheels
52' obtuse angle of second set of wheels
54 acute second set of wheels mounting bracket
54' obtuse second set of wheels mounting bracket
60 vehicle mounting portion and/or tongue extension
62 hitch bracket
70 tine support/tine shield
80 height adjuster lever
82 height adjuster button
84 height adjuster wheel connector
90 height adjuster plate
92 height adjuster plurality of apertures
100 height adjuster assembly
A tine angled to the anterior
P tine angled to the posterior
0 tine not angled Referring now to FIGS. 1A and 1B, there is depicted a perspective view of the lawn dethatching device 10, according to one alternative. In this alternative, the lawn dethatching device 10 comprises a frame 20 and a plurality of horizontally spaced-apart tines 30, a first set of wheels 40 and a second set of wheels 50. The lawn dethatching device 10 is attached to a vehicle (not shown) by a vehicle mounting portion 60. The plurality of horizontally spaced-apart tines 30 are carried by a tine support which may be a tine shield 70. As best seen in FIG. 2, the plurality of horizontally spaced-apart tines 30 are laterally angled and are spring biased 32 at one end thereof. In one alternative, the lateral angle 34 of the plurality of horizontally spaced-apart tines is less than the obtuse angle 52' of one wheel of the second set of wheels 50. The other wheel of the second set of wheels 50 is angled at an acute angle 52. The one wheel of the second set of wheels 50 is connected at one end of the tine shield 70 by an acute second set of wheels mounting bracket 54. The other wheel of the second set of wheels 50 is connected at another end of the tine shield 70 by an obtuse second set of wheels mounting bracket 54'. Each wheel of the second set of wheels 50 may be adjusted in position along the respective second set of wheels mounting bracket 54, 54' through a series of spaced apart apertures along the respective second set of wheels mounting bracket 54, 54'.

Figure 3:
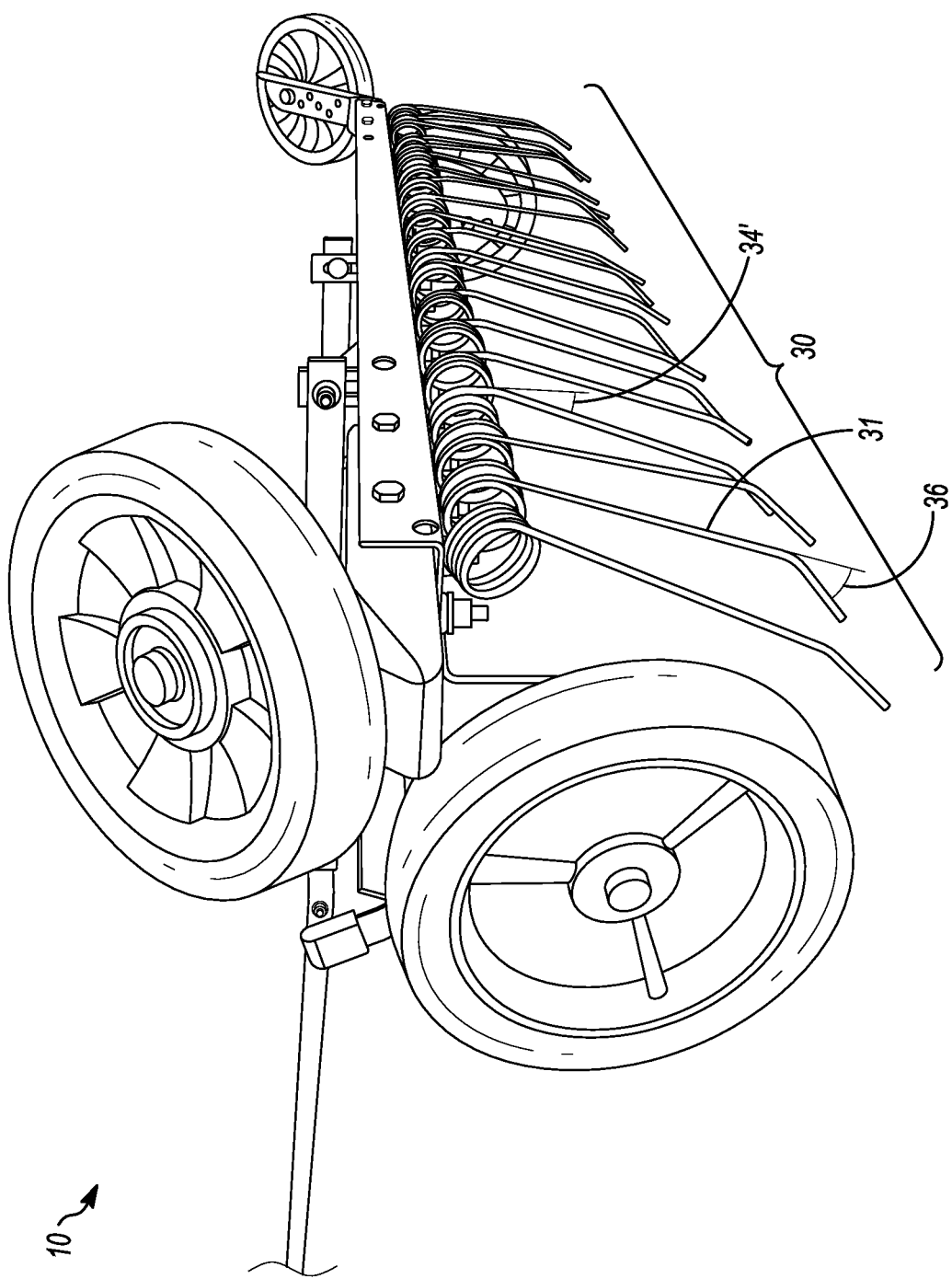
FIG. 3 depicts a side rear view of the dethatching device in a dethatching position, according to one alternative
Figure 4:
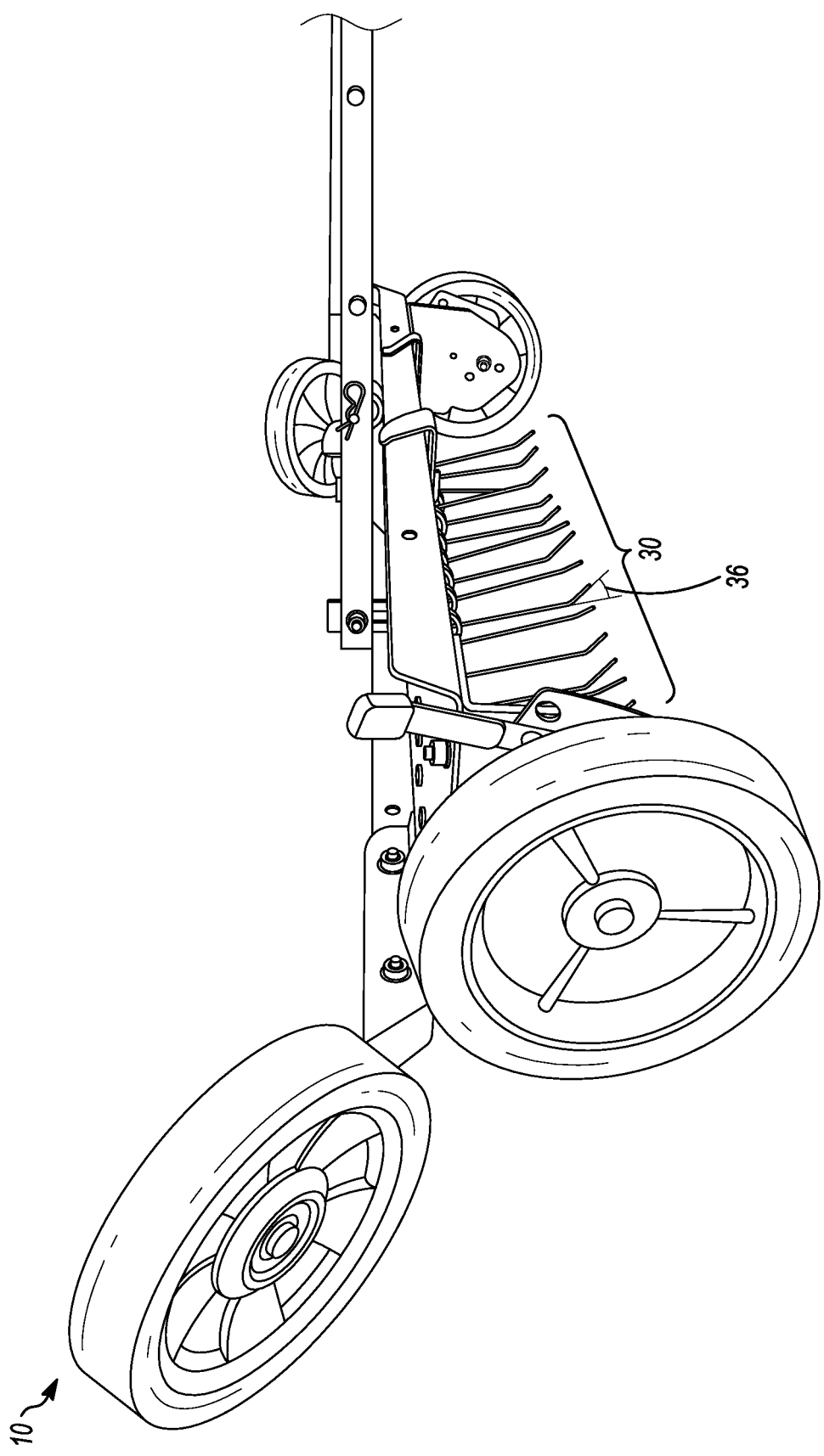
FIG. 4 depicts a side front view of the dethatching device in a dethatching position, according to one alternative

As best seen in FIGS. 3 and 4, the bottom end of each of the horizontally spaced-apart tines 30 are near or on the surface of the lawn and the terminus of the bottom end of each of the horizontally spaced-apart tines 30 are at an angle 36, in this alternative angled towards the anterior of the lawn dethatching device 10 to assist in the dethatching process and to facilitate the disengagement of the horizontally spaced-apart tines 30 from the lawn when the lawn dethatching device 10 is moved to a non-dethatching position allowing for disengagement of the collected thatch from the horizontally spaced-apart tines 30. The angle 36 may be from 0° to about 45° in relation to the body 31 of each tine. In one alternative from about 15° to about 25° in relation to the body 31 of each tine. In yet another alternative about 22°. Further, each of said horizontally spaced-apart tines 30 may be angled anteriorly or posteriorly. In this alternative, each of the horizontally spaced-apart tines 30 is angled 34' to the anterior (relative to vertical).

Figure 5A:
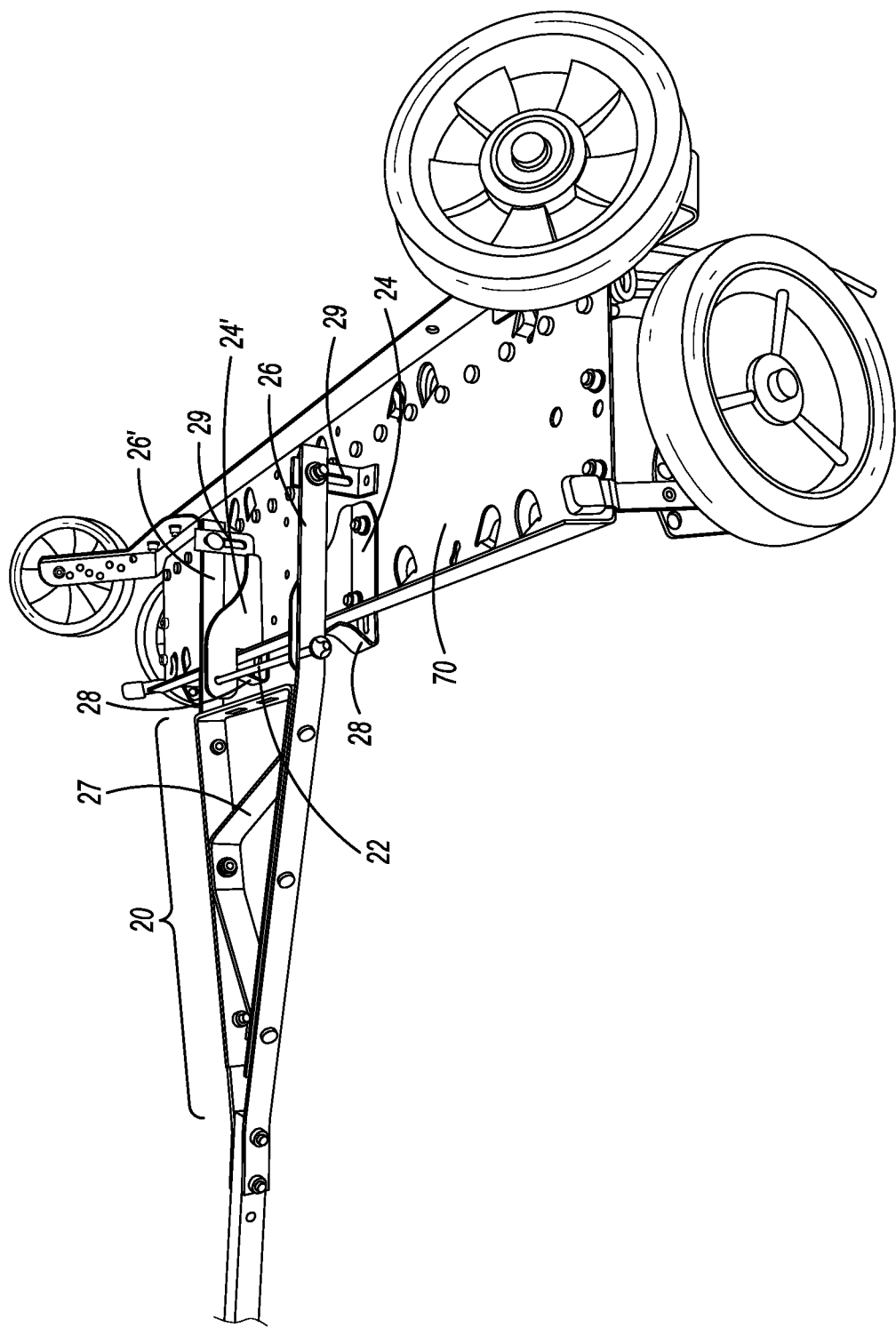
FIG. 5A depicts a top side view of the dethatching device in a dethatching position, according to one alternative
Figure 5B:
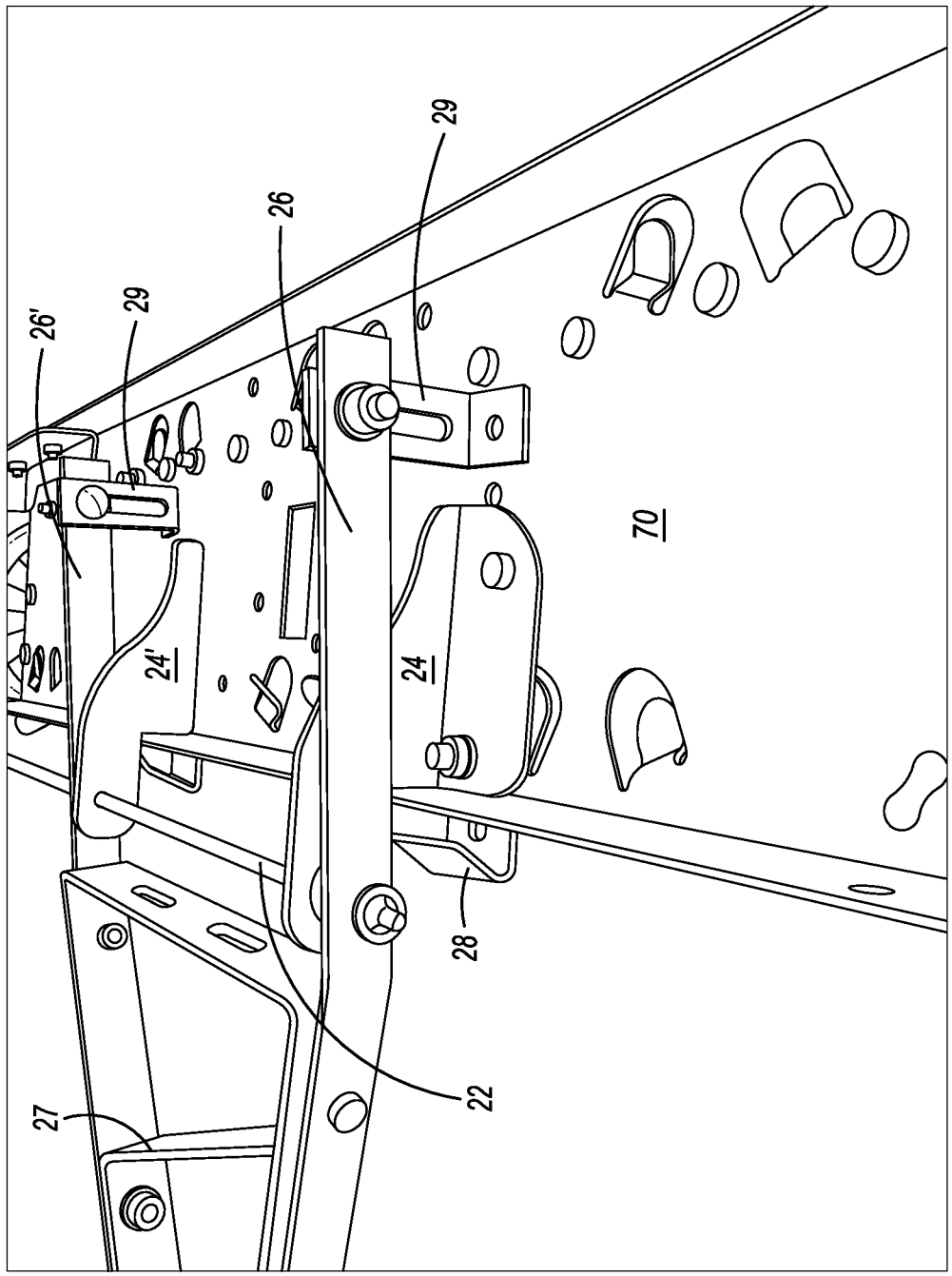
FIG. 5B depicts an exploded view of the top of the dethatching device in a dethatching position, according to one alternative

Referring now to FIGS. 5A and 5B, the frame 20 is rotatably coupled to the tine shield 70 by a horizontally disposed axle 22 running through apertures in the sides of the frame 20 and frame brackets 24, 24'. Frame brackets 24, 24' are secured to the tine shield 70, in this alternative bolted to the top of the tine shield 70 by bolts. At the posterior of frame 20, two frame arms 26, 26' each have a hitch arm bracket 29 connected thereto, in this instance each being a slotted L-shaped bracket for height and angle adjustment of the tine shield 70 and in turn the horizontally spaced-apart tines 30 (See FIG. 4) in relation to the lawn surface. Frame arms 26, 26' are braced together with frame brace 27. At the anterior of the tine shield 70 a pair of tilt stops 28 each being an L-shaped bracket, are secured to the tine shield 70.

Figure 6A:
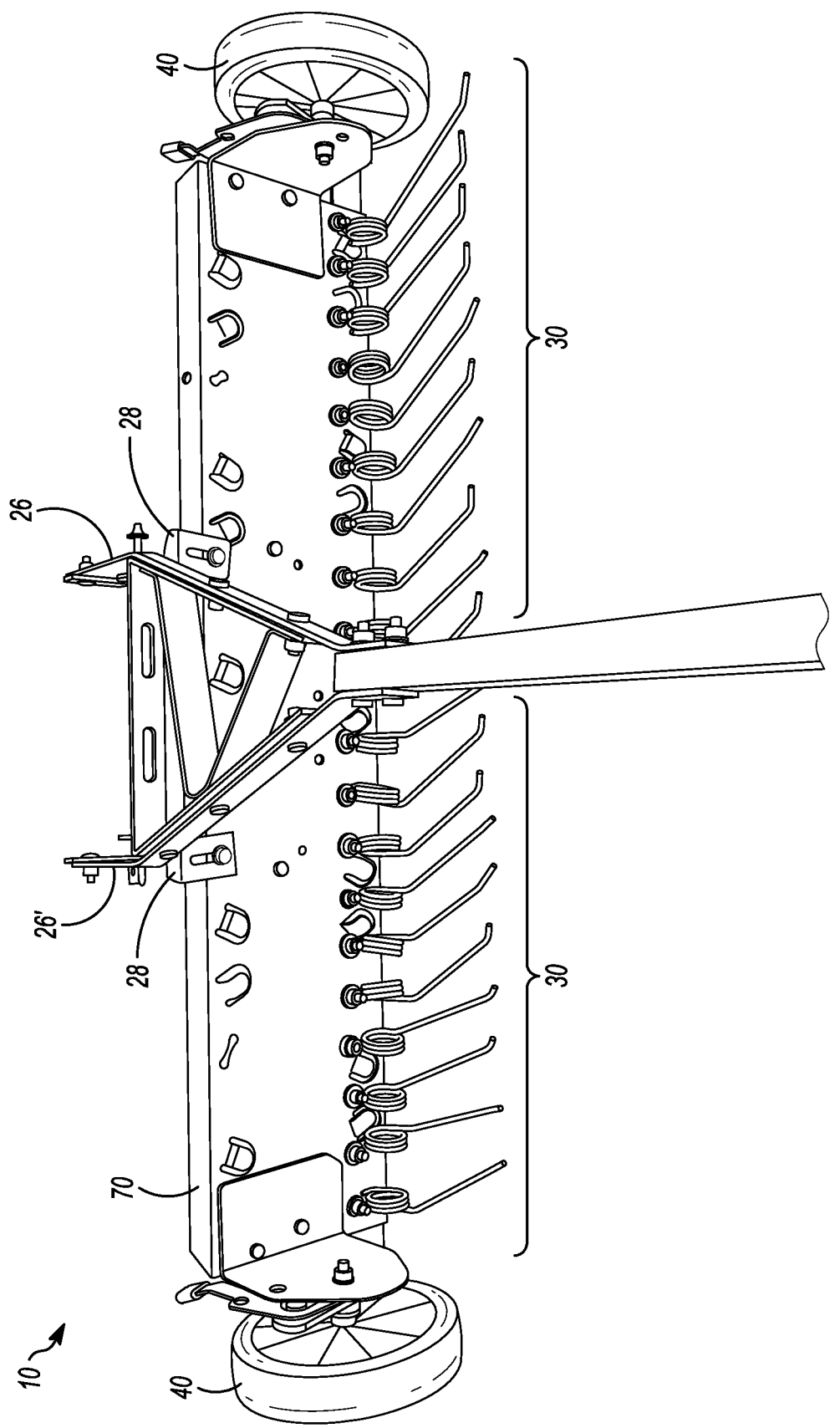
FIGS. 6A and 6B depict a front and side view, respectively, of the dethatching device in a non-dethatching position, according to one alternative
Figure 6B:
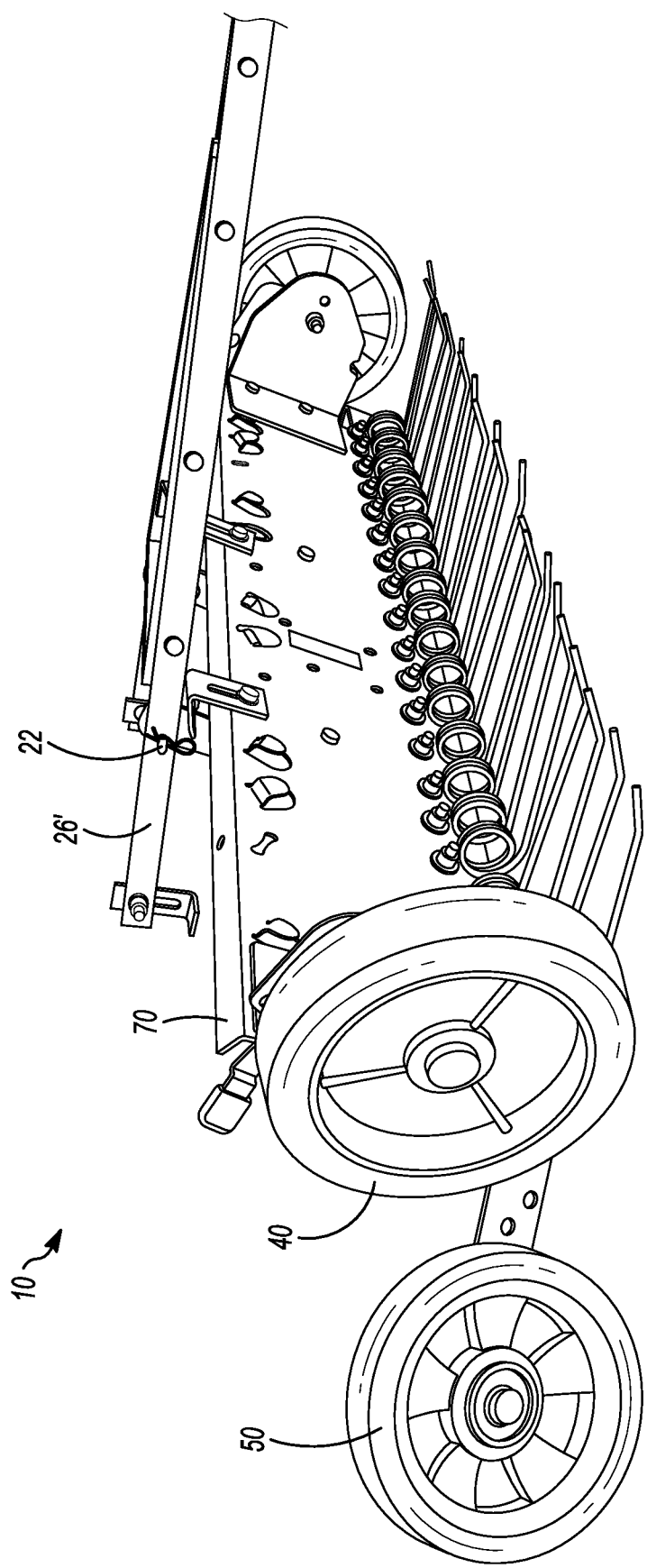

Referring now to FIGS. 6A, 6B, the lawn dethatching device 10 is in a non-dethatching position. Namely, upon reversing the direction of the vehicle, the weight of the lawn dethatching device 10 and the second set of wheels 50 (See FIG. 6B) urge the tine shield 70 to rotate towards the vehicle, by the horizontally disposed axle 22, disengaging the first set of wheels 40 from the lawn surface and engaging the second set of wheels 50 (See FIG. 6B) onto the lawn surface. The rotation of the tine shield 70 results in the plurality of horizontally spaced-apart tines 30 to decline along the lawn surface and disengaging the dethatching action of the plurality of horizontally spaced-apart tines 30 on the lawn. During the rotation into the non-dethatching position, the tilt stops 28 are guided along the bottom edge of the frame arms 26, 26' to a top area of the tilt stops 28.

Figure 7:
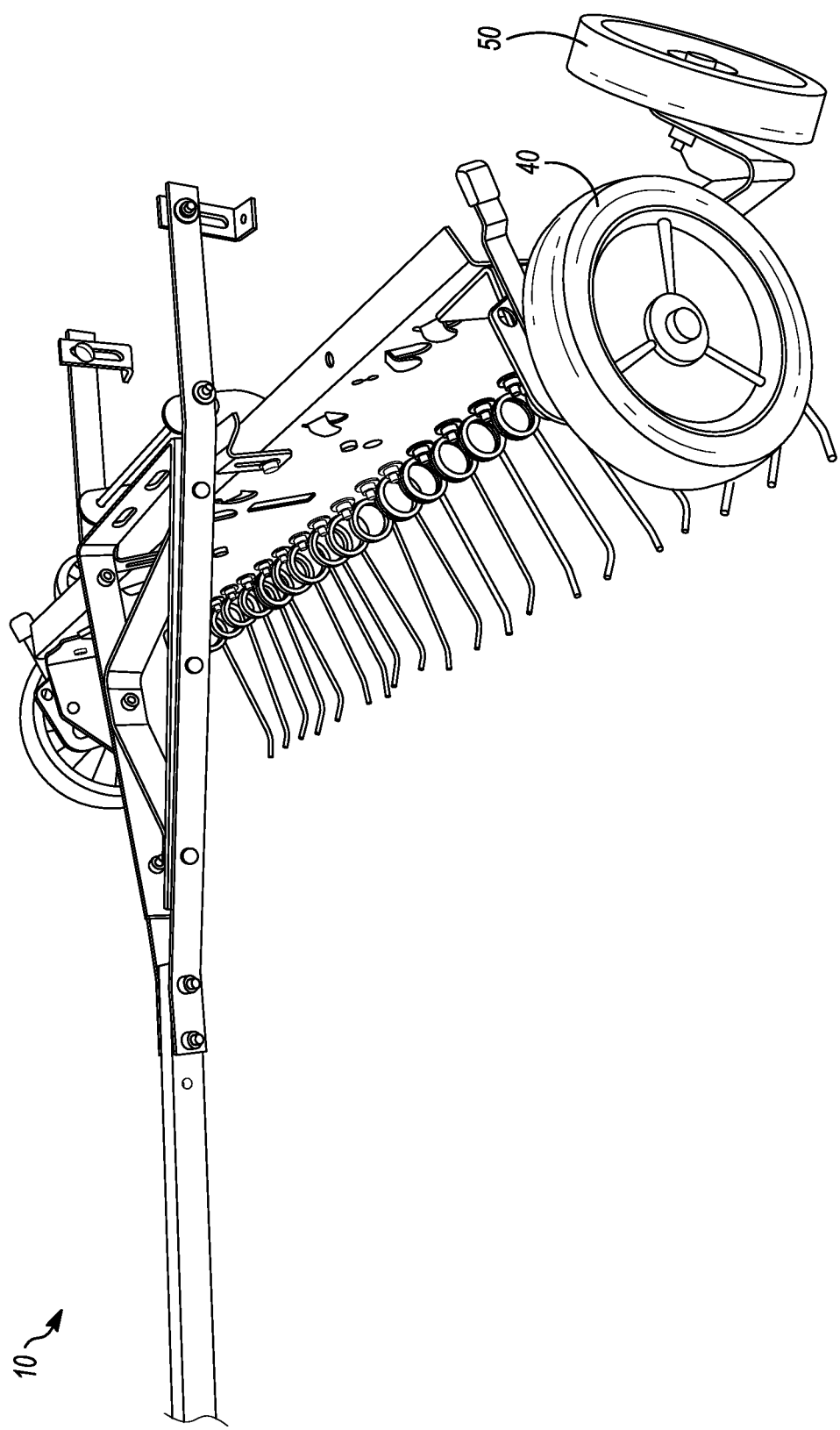
FIG. 7 depicts a side view of the dethatching device in a non-dethatching position, according to one alternative

As bets seen in FIG. 7, the second set of wheels 50 are now engaged with the lawn surface and the first set of wheels 40 are not engaged with the lawn surface. The second set of wheels 50 are angled such that movement in the reverse will move the lawn dethatching device 10 laterally away from the path of travel when in the forward or dethatching position. This allows for any collected thatch to remain in a pile for facile collection and allow the lawn dethatching device 10, once placed in forward movement and allowing the rotation to the detatching position, to move in a path clear of the collected pile of thatch.

Figure 8:
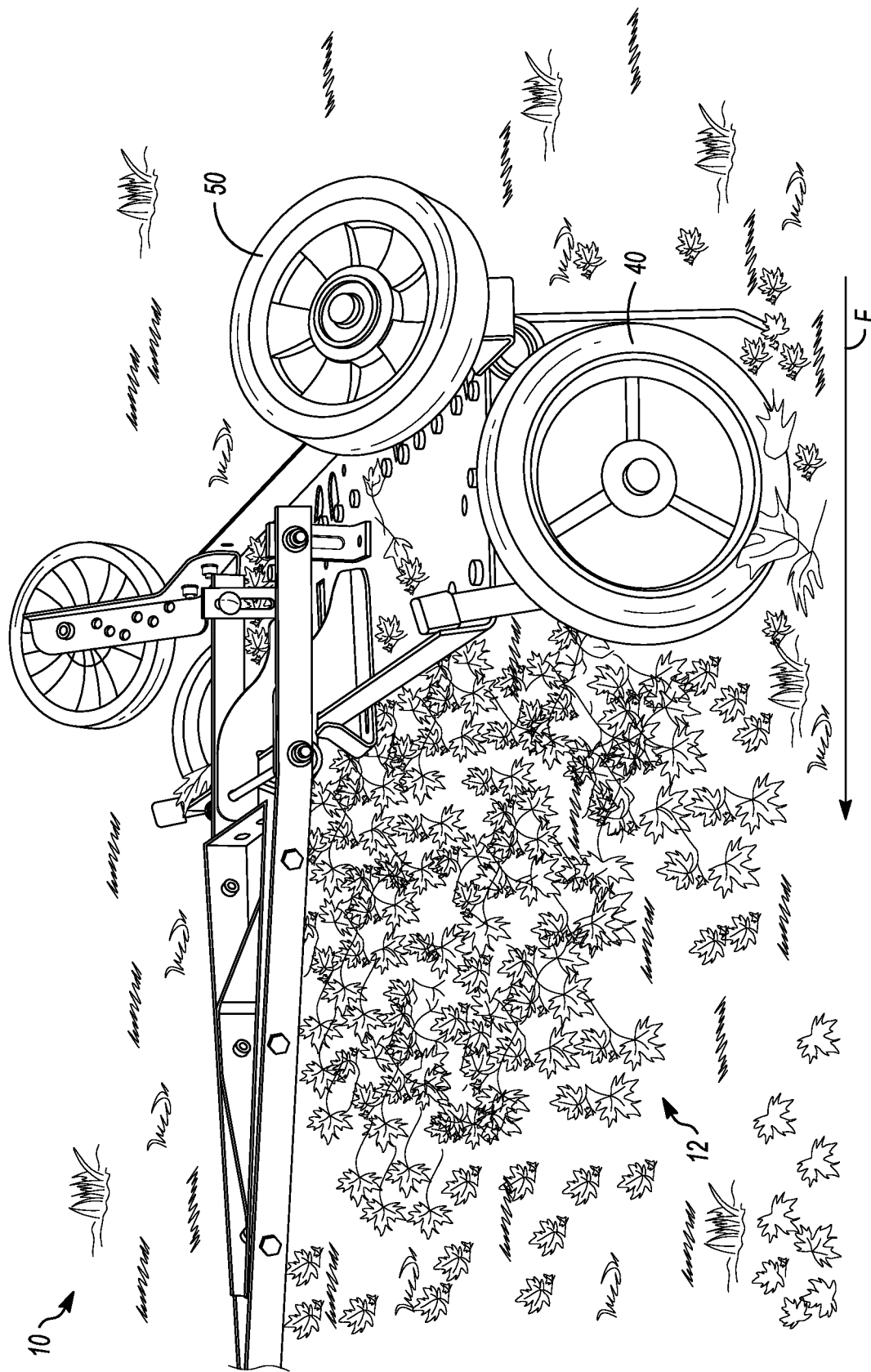
FIG. 8 depicts a side view of the dethatching device in a dethatching position, according to one alternative

Referring now to FIG. 8, the lawn dethatching device 10 is in the dethatching position, in this alternative a forward moving position, wherein the first set of wheels 40 are engaged with the lawn surface and thatch along with a pile of leaves 12 are being collected by the lawn dethatching device 10. The arrow F depicts the direction and path of movement of the lawn dethatching device 10, when in the dethatching position.

Figure 9:
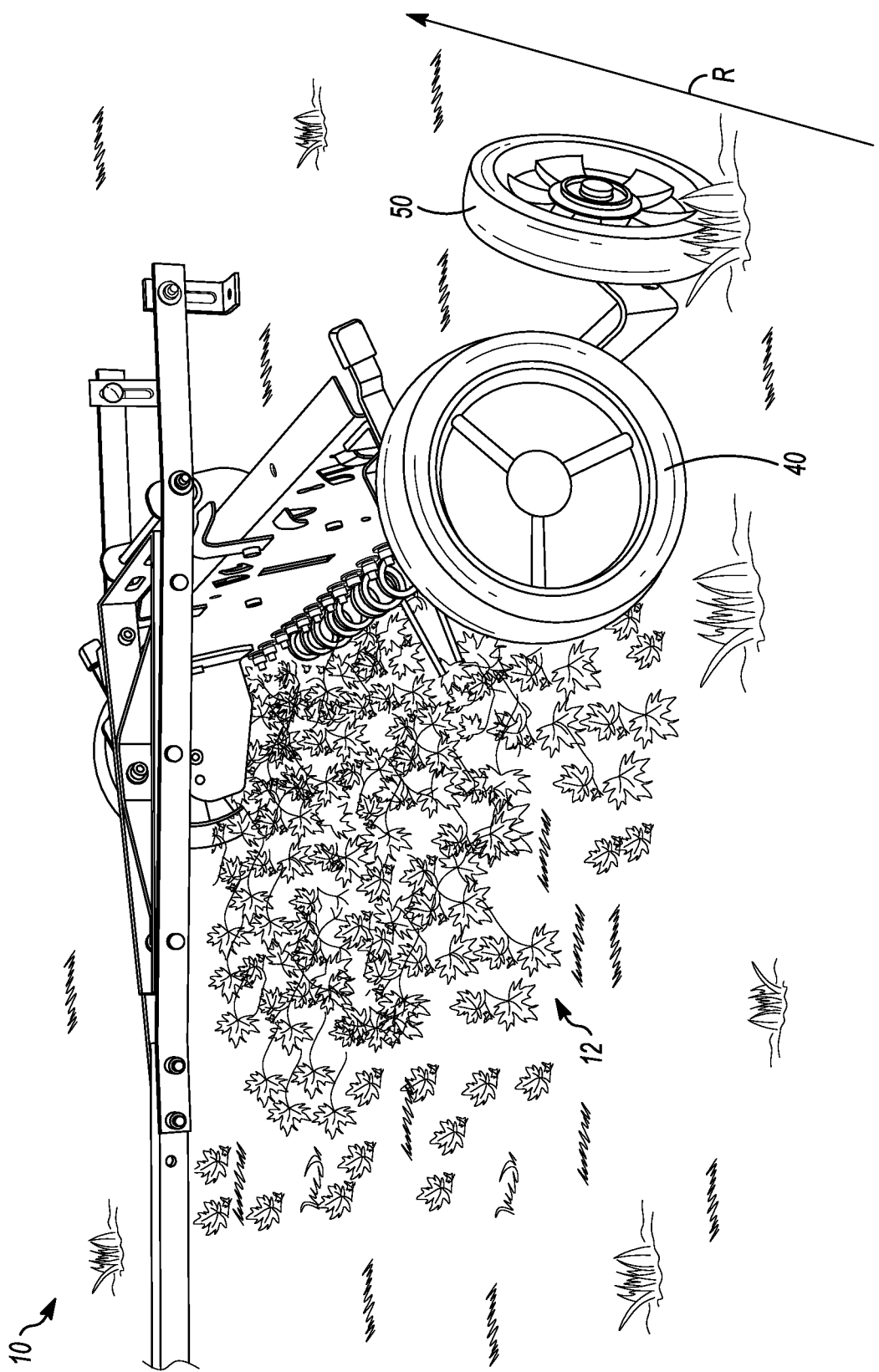
FIG. 9 depicts a side view of the dethatching device in a non-dethatching position, according to one alternative

Referring now to FIG. 9, the lawn dethatching device 10 is in the non-dethatching position, in this alternative a reverse moving position, wherein the first set of wheels 40 are not engaged with the lawn surface and the angled second set of wheels 50 are engaged with the lawn surface and moves the lawn dethatching device 10 in the opposite direction and laterally away from the pile of collected thatch and leaves 12 orienting the lawn dethatching device path of travel to one that is different than the forward path that collected the pile of collected thatch and leaves 12. In this manner, the operator may continue dethatching the lawn without need to depart the vehicle and may gather each pile of collected thatch and leaves 12 when convenient. The arrow R depicts the direction and path of movement of the lawn dethatching device 10, when in the non-dethatching position. As may be clearly seen, the reverse movement along the angled path R different from the path in forward movement, moves the lawn dethatching device 10 away from the pile of collected thatch and leaves 12 and when returned to the forward position (See FIG. 8) the lawn dethatching device moves along a path and direction F not disturbing the pile of collected thatch and leaves 12.

Figure 10:
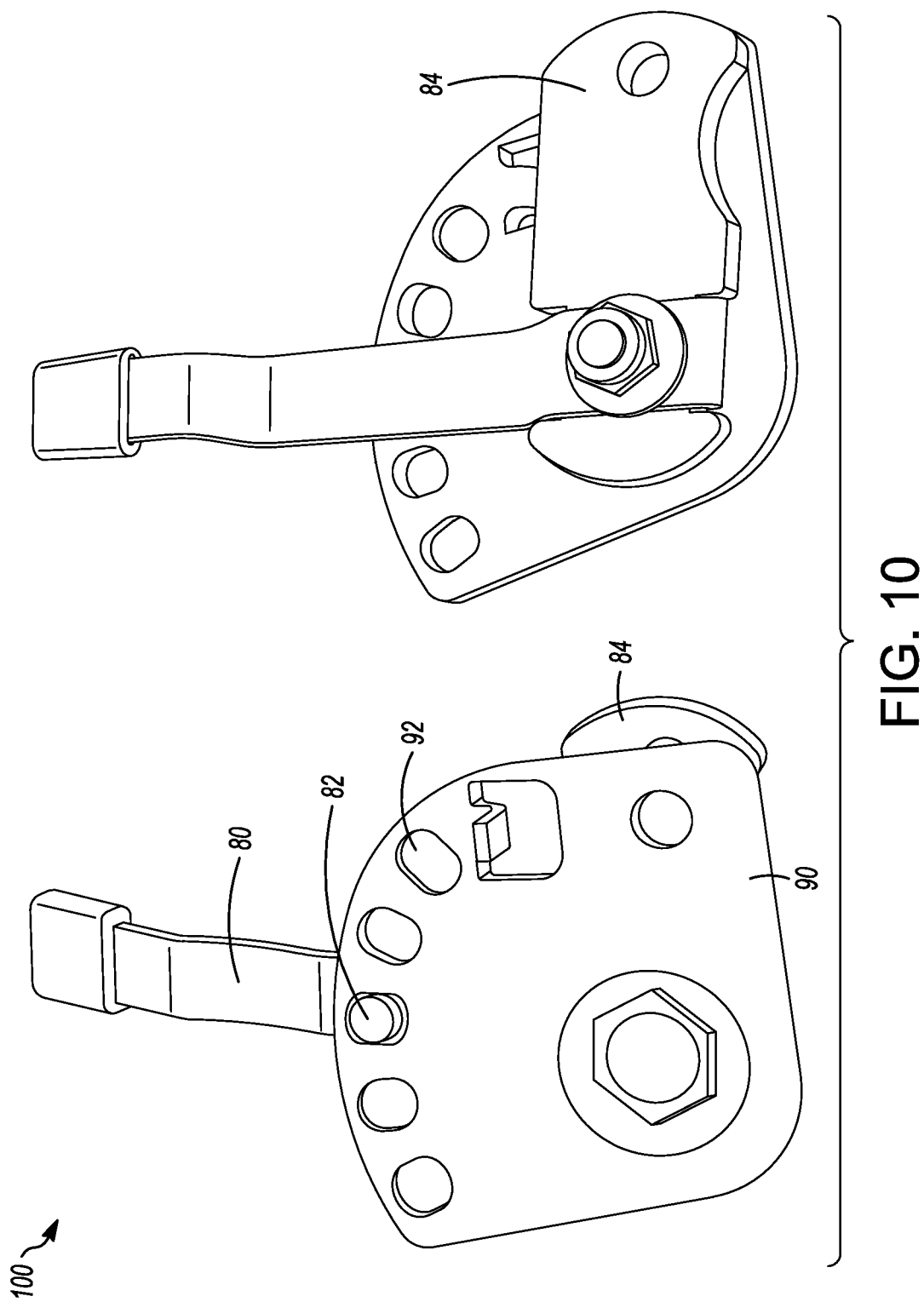
FIG. 10 depicts a height adjuster, according to one alternative

Referring now to FIG. 10, a typical height adjuster 100 is depicted wherein lever 80 is axially connected to height adjuster plate 90. Lever 80 in normal position is urged towards height adjuster plate 90. Height adjuster plate 90 include a plurality of apertures 92 along a perimeter thereof for engagement with button 82 on lever 80. Each of the first set of wheels 40 (See FIG. 1A) are axially coupled to the height adjuster plate 90 at wheel connector 84. Lifting lever 80 away from height adjuster plate 90 and moving lever 80 along the height adjuster plate 90 will adjust the height of the tine shield 70 (See FIG. 1A) thus adjusting the height of the plurality of horizontally spaced-apart tines 30 in relation to the ground surface. The operator may select the desired height by securing the button 82 in one of the plurality of apertures 92.

Figure 11:
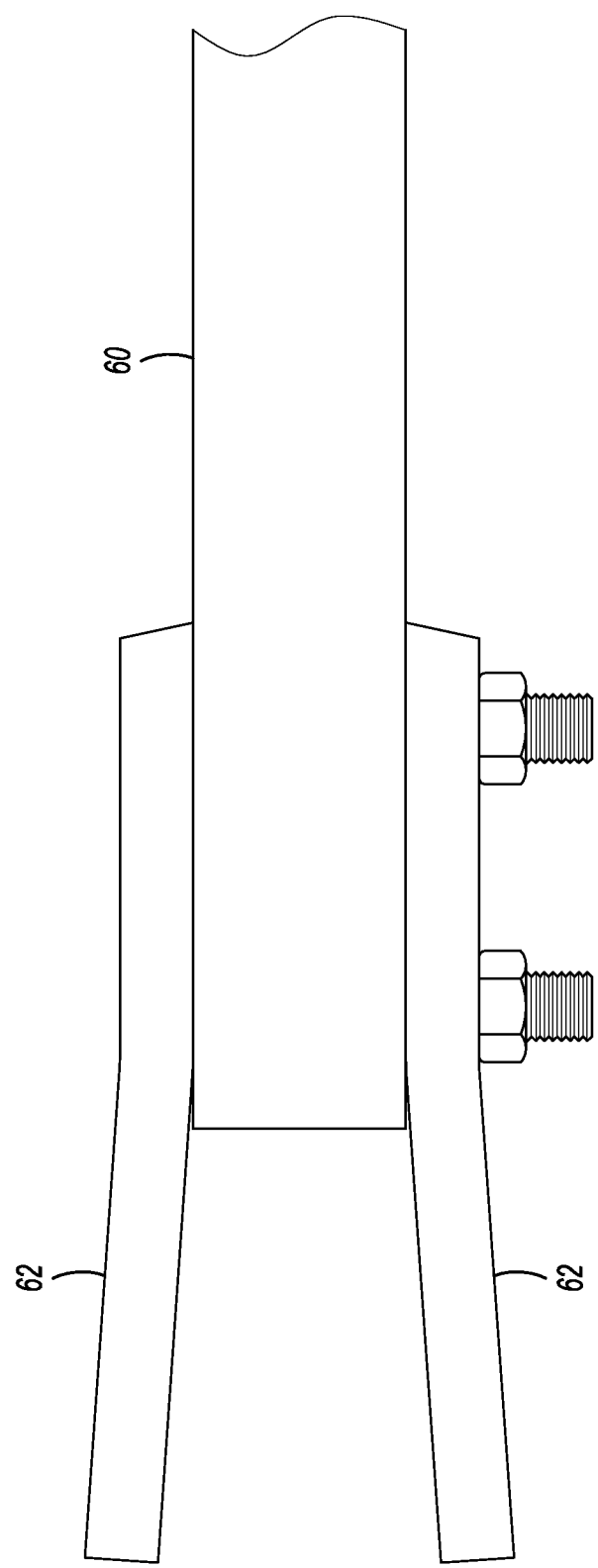
FIG. 11 depicts a hitch bracket at the end of the vehicle mounting portion, according to one alternative

Referring now to FIG. 11, two hitch brackets 62 are depicted on each side of the end of the vehicle mounting portion 60 for rotatably mounting the lawn dethatching device 10, to a vehicle.

Figure 12:
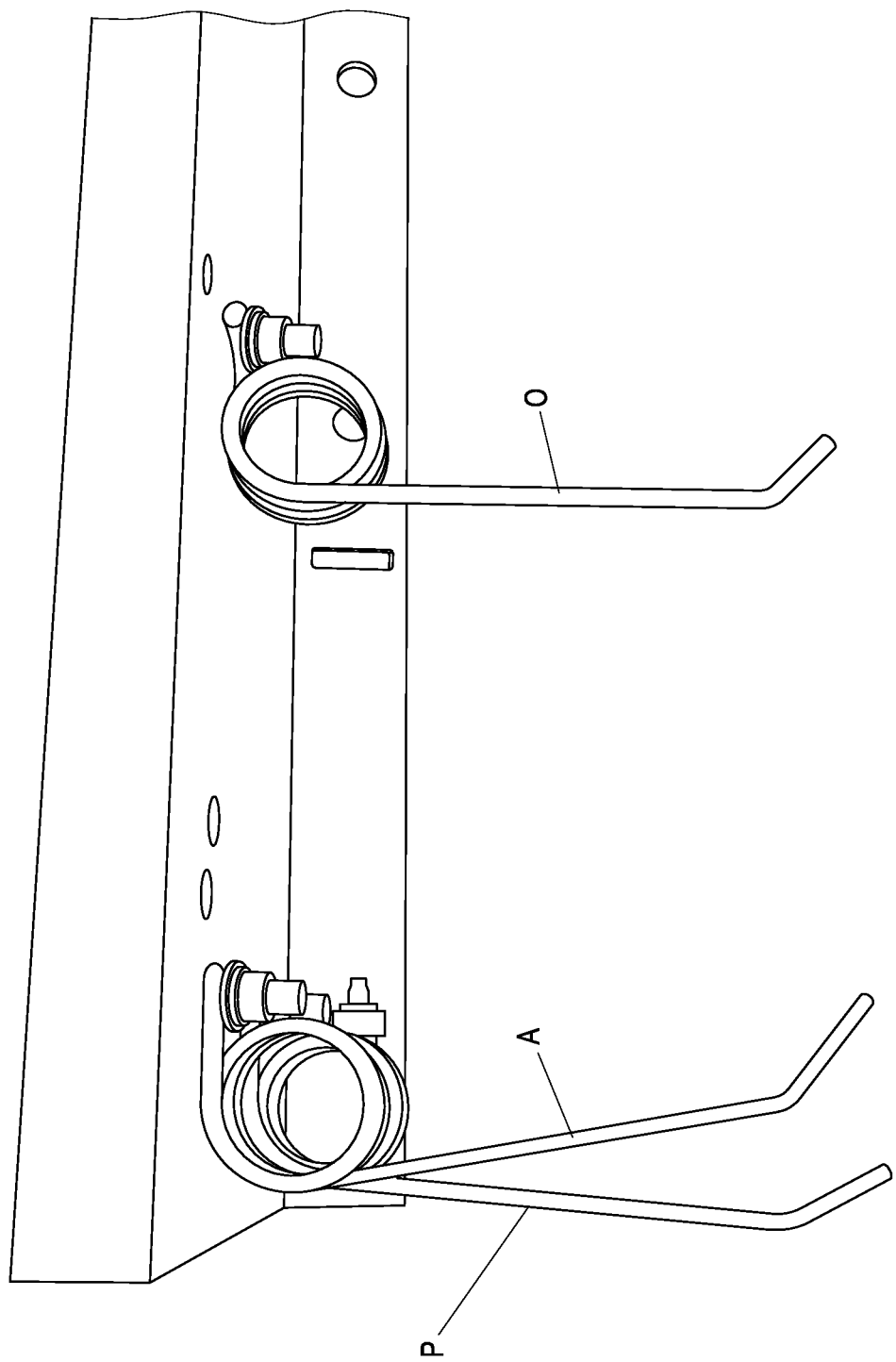
FIG. 12 depicts a side view of tines in varying positions, according to one alternative

Referring now to FIG. 12, there is depicted tines at various angles as described herein. There is depicted a tine angled to the anterior A, a tine angled to the posterior P, and a tine not angled but rather vertical 0.

In another alternative, the lawn dethatching device 10, may be used as a raking device by raising the tine level above the lawn surface, slightly higher than the level as best seen in FIG. 8.

As many changes can be made to the disclosure without departing from the scope thereof; it is intended that all matter contained herein be considered illustrative and not in a limiting sense.

The invention claimed is:

1. A lawn dethatching device for use with a vehicle, comprising:
   a tine shield having a front end and a rear end;
   a plurality of tines having a first end and a second end, wherein the first end extends from the tine shield;
   a first set of wheels supported by the tine shield and a second wheel supported by the tine shield, wherein the second wheel is offset from the first set of wheels;
   wherein the lawn dethatching device is configured to pivotally mount to the vehicle and is movable between a first position and a second position;
   wherein the first position, the first set of wheels are engaged with a ground surface and the second wheel is lifted off from the ground surface, such that the first end of the plurality of tines is disposed above the second end of each of the plurality of tines to dethatch the ground surface;
   wherein the second position, the tine shield is rotated by moving the lawn dethatching device in a reverse direction such that the second wheel is engaged with the ground surface and the first set of wheels are lifted from the ground surface, thereby changing an angle of the plurality of tines to a non-dethatching orientation.

2. The lawn dethatching device of claim 1, wherein the tine shield comprises two sides and each of said plurality of tines are laterally angled towards one side of the two sides of said tine shield within a range selected from the group of: 0° to about 60°; from about 30° to about 45°, and about 35°.

3. The lawn dethatching device of claim 1, wherein said plurality of tines are rotatably coupled to said tine shield.

4. The lawn dethatching device of claim 1, wherein said first end of each of said plurality of tines is rotatably coupled in a horizontal axis to said tine shield.

5. The lawn dethatching device of claim 1, wherein each wheel of said first set of wheels is on a side of the tine shield allowing for the plurality of tines to be in the first position.

6. The lawn dethatching device of claim 1, wherein the second wheel is a pair of wheels.

7. The lawn dethatching device of claim 1, wherein the second wheel is a pair of wheels, wherein each wheel of the pair of wheels is on a side of the tine shield allowing for the plurality of tines to be in said second position, while moving said tine shield in reverse and laterally.

8. The lawn dethatching device of claim 1, wherein the second wheel is angled along a radial axle in a non-parallel configuration to said first set of wheels.

9. The lawn dethatching device of claim 1, wherein the second wheel is laterally angled towards one side of said tine shield.

10. The lawn dethatching device of claim 1, wherein said second end of each of said plurality of tines is anteriorly angled.

11. The lawn dethatching device of claim 1, wherein said second end of each of said plurality of tines is angled in relation to said first end from about 0° to about +/−30° anteriorly and posteriorly.

12. The lawn dethatching device of claim 1, wherein a terminus of said second end of each of said plurality of tines is anteriorly angled from greater than about 0° to about 45°.

13. The lawn dethatching device of claim 1, wherein a terminus of said second end of each of said plurality of tines is anteriorly angled from about 15° to about 25°.

14. The lawn dethatching device of claim 1, wherein a terminus of said second end of each of said plurality of tines is anteriorly angled about 22°.

15. The lawn dethatching device of claim 1, further comprising a mounting portion extending from the front end of the tine shield.

16. The lawn dethatching device of claim 1, wherein said lawn dethatching device is transitioning to the second position, each of said plurality of tines rotate to a reclined position and the first set of wheels are disengaged to be no longer in contact with the ground surface and the second wheel is engaged to be in contact with the ground surface moving said lawn dethatching device in a reverse direction along the ground surface without dethatching said lawn, providing a clear path for said lawn dethatching device to move in forward direction when said first set of wheels are re-engaged with the ground surface.

17. The lawn dethatching device of claim 1, wherein said lawn dethatching device is transitioning to the first position, when starting to move said lawn dethatching device in a forward direction, each of said plurality of tines rotate to a vertical position and the second wheel is disengaged to be no longer in contact with the ground surface and the first set of wheels are engaged to be in contact with the ground surface moving said lawn dethatching device in the forward direction allowing for each of said plurality of tines to engage the ground surface and dethatch the ground surface.

18. The lawn dethatching device of claim 1, wherein said lawn dethatching device is transitioning to the first position, when starting to move said lawn dethatching device in a forward direction, each of said plurality of tines rotate to a vertical position and the second wheel is disengaged to be no longer in contact with the ground surface and the first set of wheels are engaged to be in contact with the ground surface moving said lawn dethatching device in the forward direction allowing for each of said plurality of tines to engage the ground surface and dethatch the ground surface, wherein the forward direction is along a path different than a previous forward direction path.

19. The lawn dethatching device of claim 1, wherein said tine shield further comprises a tine support supporting said plurality of tines.

20. The lawn dethatching device of claim 1, wherein said plurality of tines are height adjustable.

* * * * *